(12) United States Patent
Chen (10) Patent No.: US 10,013,369 B2
(45) Date of Patent: Jul. 3, 2018

(54) SERVER SYSTEM WITH BMC HAVING HARD DISK DRIVE MONITORING FUNCTION

(71) Applicant: ASPEED Technology Inc., Hsinchu (TW)

(72) Inventor: Chien-Chou Chen, Hsinchu (TW)

(73) Assignee: Aspeed Technology Inc., Hsinchu (TW)

( * ) Notice: Subject to any disclaimer, the term of this patent is extended or adjusted under 35 U.S.C. 154(b) by 228 days.

(21) Appl. No.: 14/928,983

(22) Filed: Oct. 30, 2015

(65) Prior Publication Data

US 2017/0124006 A1    May 4, 2017

(51) Int. Cl.
*G06F 11/00*    (2006.01)
*G06F 13/16*    (2006.01)
*G06F 13/40*    (2006.01)
*G06F 13/42*    (2006.01)

(52) U.S. Cl.
CPC ...... *G06F 13/1605* (2013.01); *G06F 13/4068* (2013.01); *G06F 13/4282* (2013.01)

(58) Field of Classification Search
CPC ............ G06F 13/1605; G06F 13/4068; G06G 13/4282
See application file for complete search history.

(56) References Cited

U.S. PATENT DOCUMENTS

| | | | |
|---|---|---|---|
| 7,685,329 B1 * | 3/2010 | Sivertsen | G06F 13/4068 710/15 |
| 7,853,821 B2 * | 12/2010 | Knapstad | G06F 11/201 709/213 |
| 8,078,770 B1 | 12/2011 | Sivertsen | |
| 8,260,976 B1 * | 9/2012 | Dhandapani | G06F 13/4291 710/15 |
| 8,938,566 B2 * | 1/2015 | Dhandapani | G06F 3/0604 710/300 |

(Continued)

FOREIGN PATENT DOCUMENTS

| CN | 102467425 A | * | 5/2012 |
|---|---|---|---|
| CN | 102708909 A | | 10/2012 |

(Continued)

OTHER PUBLICATIONS

See Abstract of CN 102467425 A.*

(Continued)

*Primary Examiner* — Jason B Bryan (74) *Attorney, Agent, or Firm* — Muncy, Geissler, Olds & Lowe, P.C.

(57) ABSTRACT

A server system is disclosed. The server system comprises a host system, at least one hard disk (HD) drive, a host bus adapter (HBA), at least one indicator, a storage enclosure processor (SEP), a baseboard management controller (BMC) and a snoop device. The HBA is used to issue a bus signal in a format suitable for transmission over a serial bus according to the received drive state from the at least one HD drive and send the bus signal over the serial bus. The SEP receives the bus signal over the serial bus and drives the at least one indicator to corresponding states. The BMC is coupled to a network. The snoop device detects the bus signal over the serial bus and sends a warning signal to the BMC when a drive failure event is detected.

10 Claims, 6 Drawing Sheets

(56) References Cited

U.S. PATENT DOCUMENTS

| | | | |
|---|---|---|---|
| 2003/0005367 A1* | 1/2003 | Lam | G06F 11/0727 |
| | | | 714/42 |
| 2010/0235688 A1* | 9/2010 | Bennah | G06F 11/0781 |
| | | | 714/57 |
| 2012/0110389 A1 | 5/2012 | Chen et al. | |
| 2013/0080697 A1* | 3/2013 | Dhandapani | G06F 11/3034 |
| | | | 711/114 |
| 2013/0159561 A1 | 6/2013 | Cong | |
| 2016/0127167 A1* | 5/2016 | Chou | H04L 41/0226 |
| | | | 709/223 |

FOREIGN PATENT DOCUMENTS

| | | |
|---|---|---|
| TW | 201217989 A | 5/2012 |
| TW | 201327156 A | 7/2013 |

OTHER PUBLICATIONS

SFF-8485 Specification for Serial GPIO (SGPIO) Bus, Revision 0.7, Feb. 1, 2006, pp. 1-39.
SAF-TE Interface Specification, SCSI Accessed Fault-Tolerant Enclosures, Revision Intermediate Review R041497, Apr. 14, 1997, pp. 1-38.
SFF-8489 Specification for SGPIO IBPI, Rev 0.4, Nov. 29, 2011, pp. 1-13.

* cited by examiner

| Bit<br>Byte | 7 | 6 | 5 | 4 | 3 | 2 | 1 | 0 |
|---|---|---|---|---|---|---|---|---|
| 0 | Operation Code (10h) ||||||||
| 1 | Slot 0 Byte 0 ||||||||
| 2 | Slot 0 Byte 1 ||||||||
| 3 | Slot 0 Byte 2 ||||||||
| ... | ... ||||||||
| 3N | Slot N-1 Byte 0 ||||||||
| 3N+1 | Slot N-1 Byte 1 ||||||||
| 3N+2 | Slot N-1 Byte 2 ||||||||
| 3N+3 | Vendor Specific ||||||||

SERVER SYSTEM WITH BMC HAVING HARD DISK DRIVE MONITORING FUNCTION

BACKGROUND OF THE INVENTION

Field of the Invention

The invention relates to a server system, and more particularly, to a BMC having a hard disk (HD) drive monitoring function in a server system.

Description of the Related Art

Figure 1:
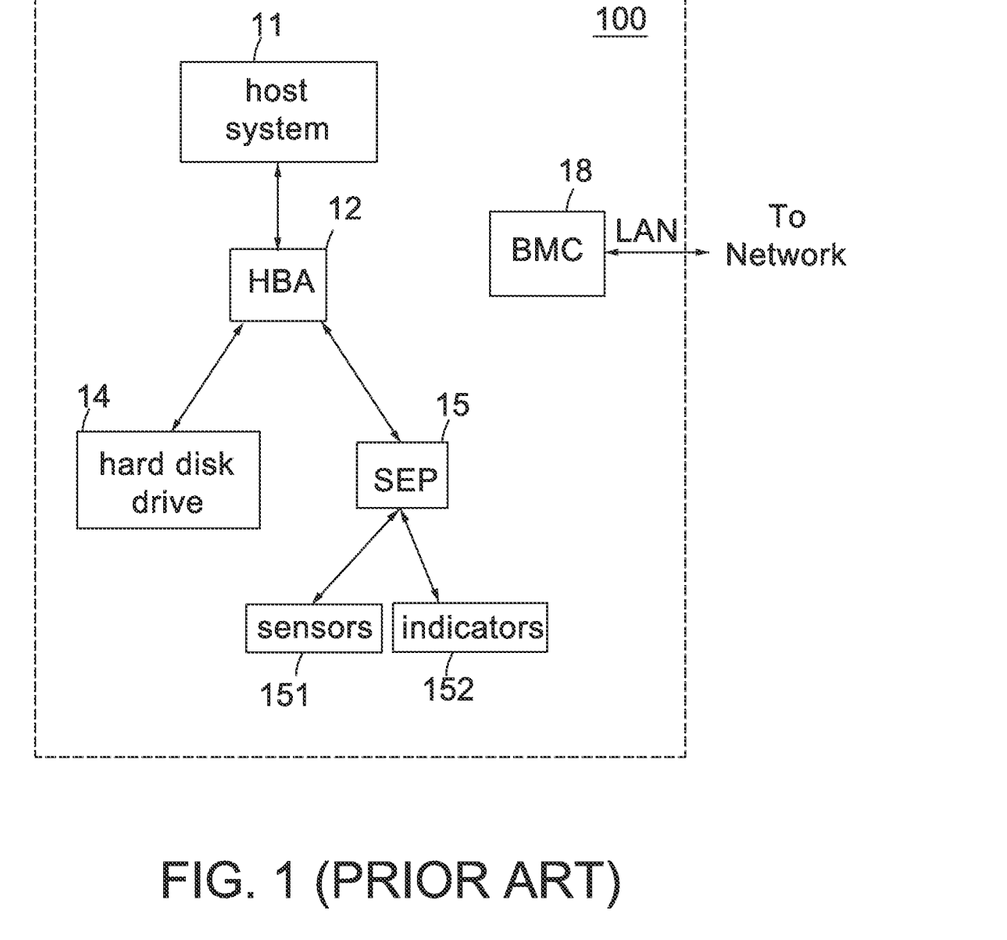
FIG. 1 shows a schematic diagram of a conventional server system.

FIG. 1 shows a schematic diagram of a conventional server system. Referring to FIG. 1, the server system 100 includes a host system 11, a host bus adapter (HBA) 12, a hard disk drive 14, a storage enclosure processor (SEP) 15, a plurality of sensors 151, a plurality of indicators 152 and a baseboard management controller (BMC) 18. The HBA 12 is connected to the host system 11 while the HD drive 14 and the SEP 15 is connected to the HBA 12. The SEP 15 interfaces with various sensors 151 and indicators 152 (e.g. LEDs, LCDs, audible alarms, etc.).

Once the HD drive 14 fails, the SEP 15 is informed by the HBA 12 and then drives the indicators 152 to indicate the drive failure event. A system administrator of a corporate network may be present at one location while the servers may be spread around the buildings or even anywhere of the internet. It is very difficult and costly for the system administrator to be physically present at each server side and check each drive state.

Under this circumstance, a remote management function supported by a BMC may help the system administrator to be able to get each drive state for each server system through the network, just like the system administrator physically present at each server side. Conventionally, there are three ways for the BMC 18 to get each drive state. (1) Install self-monitoring, analysis and reporting technology (S.M.A.R.T.) software on the host system 11. The BMC 18 can get the state of the HD drive 14 from the S.M.A.R.T. software. However, the customer that owns the server system 100 generally does not agree because installing the S.M.A.R.T. software may incur a data leakage risk. (2) Create a peripheral component interconnect express (PCIe) bus between the HBA 12 and the BMC 18. The BMC 18 can get each drive state via management component transport protocol (MCTP) over PCIe bus. However, the HBA 12 having PCIe bus and supporting MCTP needs to be customized, which is not cost efficient. (3) Create an I²C bus between the HBA 12 and the BMC 18. The BMC 18 can get each drive state via the I²C bus. Likewise, the HBA 12 having I²C bus interfacing with the BMC 18 needs to be customized, which is not cost efficient.

Accordingly, what is needed is a server system to address the above-identified problems. The invention addresses such a need.

SUMMARY OF THE INVENTION

In view of the above-mentioned problems, an object of the invention is to provide a server system with a BMC having a hard disk drive monitoring function, thus avoiding any data leakage risk and saving hardware cost.

One embodiment of the invention provides a server system with a BMC having a hard disk drive monitoring function. The server system comprises a host system, at least one hard disk (HD) drive, a host bus adapter (HBA), at least one indicator, a storage enclosure processor (SEP), a baseboard management controller (BMC) and a snoop device. Each of the at least one hard disk (HD) drive provides its own drive state for the HBA. The HBA coupled to the host system and the at least one HD drive is used to issue a bus signal in a format suitable for transmission over the serial bus according to the received drive state from the at least HD drive and send the bus signal over the serial bus. The SEP coupled to the HBA through the serial bus and to the at least one indicator is used to receive the bus signal and drive the at least one indicator to corresponding states. The BMC is coupled to a network. The snoop device detects the bus signal over the serial bus and sends a warning signal to the BMC when a drive failure event is detected.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

As used herein and in the claims, the term "a," "an," "the" and similar terms used in the context of the present invention (especially in the context of the claims) are to be construed to cover both the singular and plural unless otherwise indicated herein or clearly contradicted by the context.

A feature of the invention is to constantly snoop commands/data/waveforms over a serial bus between a HBA and a SEP by a snoop device in a server system to detect a HD failure event. Accordingly, as soon as any HD failure event is detected, the snoop device informs the BMC and then the BMC logs the HD failure event and informs the system administrator in real time.

Figure 2:
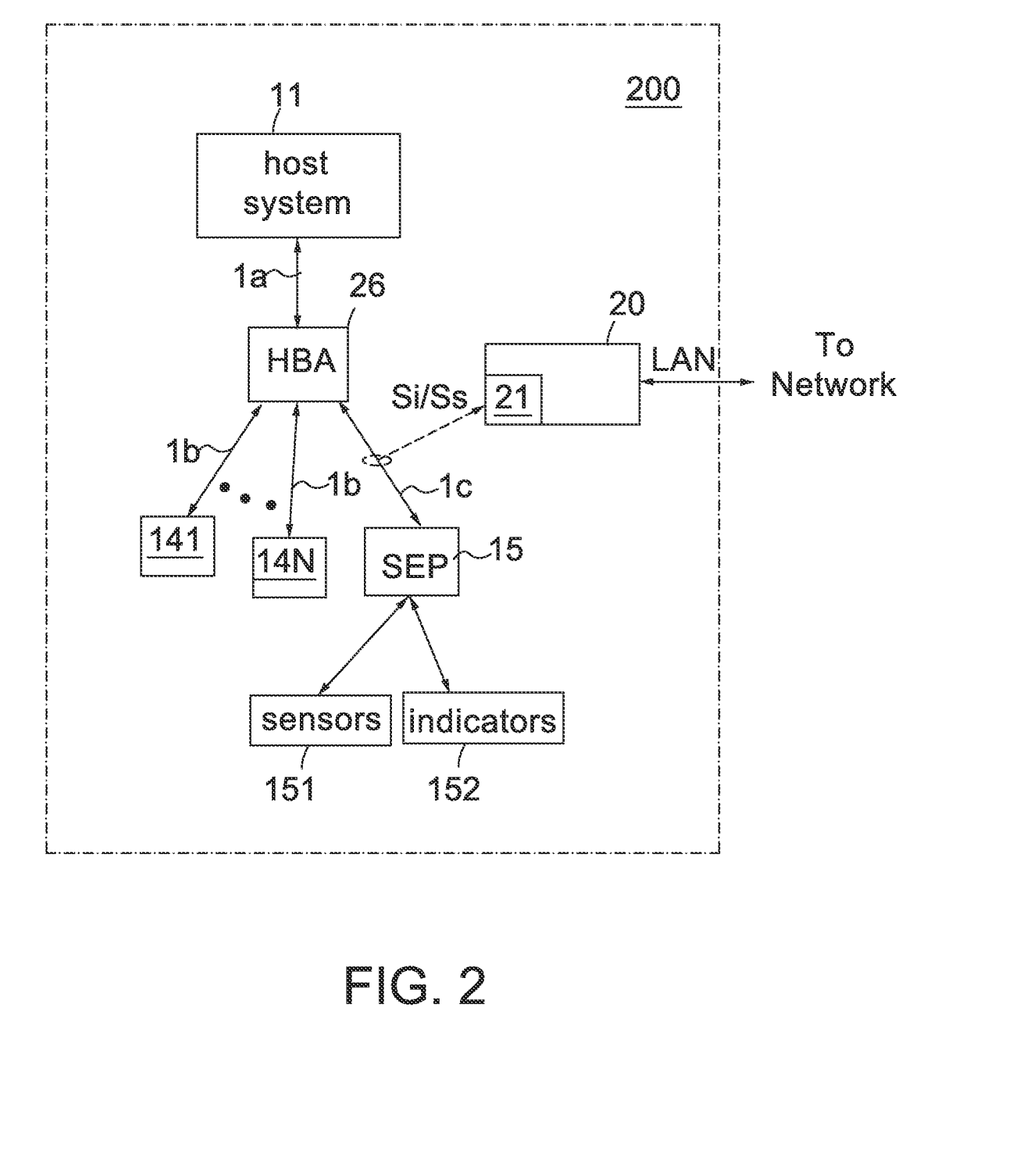
FIG. 2 shows a schematic diagram of a server system according to an embodiment of the invention.

FIG. 2 shows a schematic diagram of a server system according to an embodiment of the invention. Referring to FIG. 2, the server system 200 includes a host system 11, a HBA 26, at least one SATA (serial advanced technology attachment)/SAS (serial attached SCSI) drive 141~14N (N>=1, N is a positive integer), a SEP 15, at least one sensor 151, at least one indicator 152 and a BMC 20. Here, the BMC 20 includes a snoop device 21.

The BMC 20 is used to manage and monitor the operations of the server system 200. The HBA 26 is connected to the host system 11 via a PCIe bus 1a while the SEP 15 is connected to the HBA 26 via a serial bus 1c. The SEP 15 interfaces with various sensors 151 and indicators 152 (e.g. LEDs, LCDs, audible alarms, etc.). The HBA 26 communicates with each of the SATA/SAS drives 141~14N via a corresponding SATA/SAS bus 1b to obtain the state information for each HD drive. The HBA 26 may support at least one of the following command protocols: SES (SCSI Enclosure Services), SAF-TE (SCSI Accessed Fault-Tolerant Enclosure), and SATA II. After collecting all the state information reported by all the SATA/SAS drives 141~14N, the HBA 26 generally issues a bus signal in a format suitable for transmission over the serial bus 1c and then sends the bus signal through the serial bus 1c to the SEP 15 for controlling devices such as the sensors 151 and the indicators 152. For example, if the state information indicates there is a failed SATA/SAS drive 141, the HBA 26 instantly issues a corresponding bus signal in a format suitable for transmission over the serial bus 1c and then sends the bus signal through the serial bus 1c to the SEP 15 for turning on a corresponding one of the indicators 152, e.g., a Fail LED (not shown) corresponding to the SATA/SAS drive 141.

In order to detect a drive failure event in real time, a snoop device 21 embedded inside the BMC 20 of the invention is used to constantly monitor/detect the commands/data/waveforms over the serial bus 1c between the HBA 26 and the SEP 15. Example serial bus 1c includes, without limitation, $I^2C$ bus and SGPIO bus. It should be understood, however, that the above serial bus 1c of the invention is not limited to $I^2C$ bus and SGPIO bus described above, but fully extensible to any existing or yet-to-be developed serial bus; besides, the above command protocols (supported by the HBA 26) of the invention is not limited to SES, SAF-TE, and SATA II described above, but fully extensible to any existing or yet-to-be developed command protocols. In an embodiment, the HBA 26 may include a conversion circuit (e.g., SEMB (SATA enclosure management bridge)) (not shown) able to convert the corresponding SES/SAF-TE/SATA II command into a bus signal in a format suitable for transmission over the serial bus 1c. Please be noted that the snoop device 21 can be located external to the BMC 20 depending on different circuit needs.

Figure 3A:
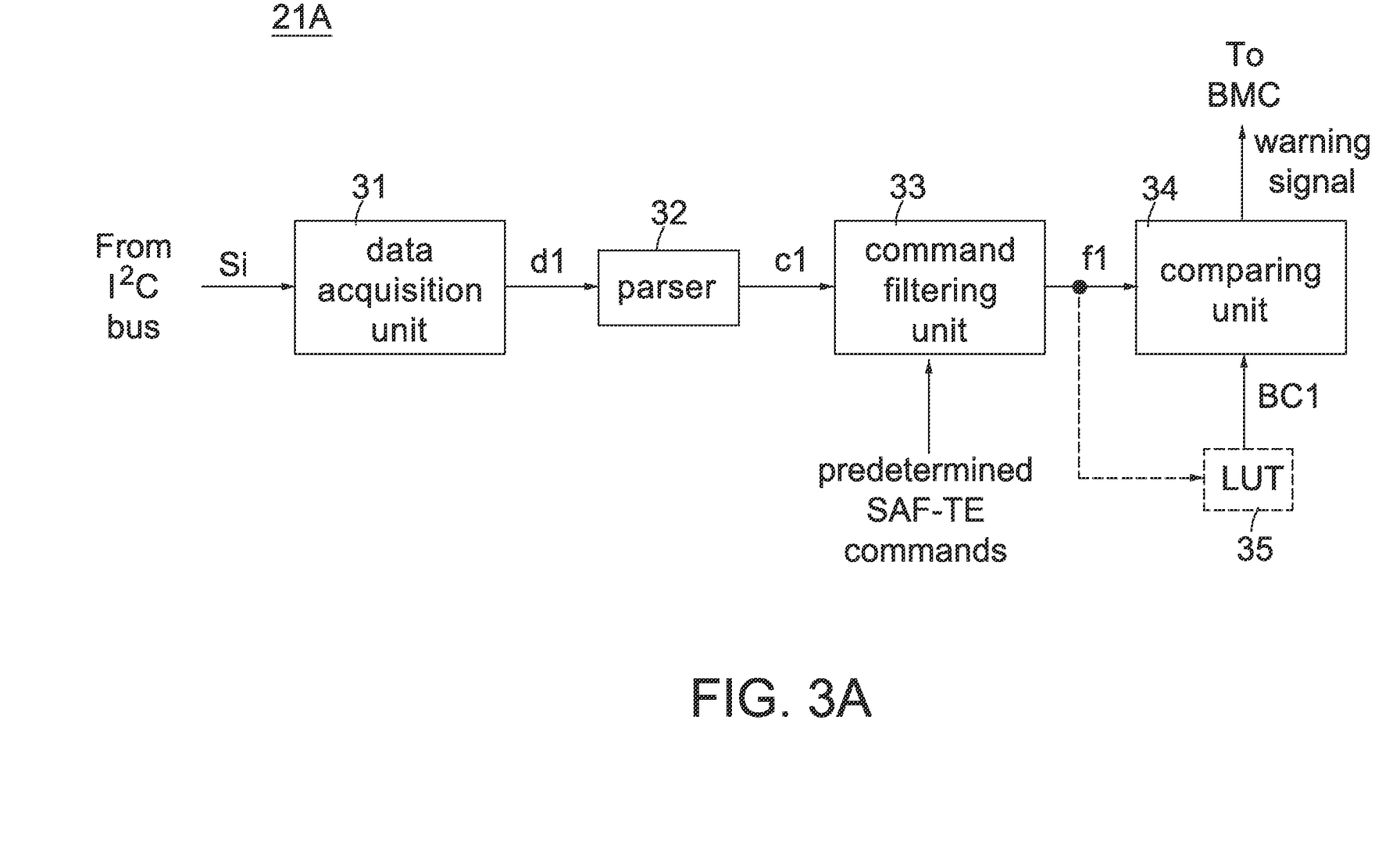
FIG. 3A is a block diagram of a snoop device according to an embodiment of the invention.

FIG. 3A is a block diagram of a snoop device according to an embodiment of the invention. In the embodiment of FIG. 3A, assuming the serial bus 1c is $I^2C$ bus and the HBA 26 is able to convert a SAF-TE command into a bus signal in an $I^2C$ bus format. Referring to FIG. 3A, the snoop device 21A includes a data acquisition unit 31, a parser 32, a command filtering unit 33, a comparing unit 34 and a look-up table (LUT) 35.

Please be noted that the snoop device 21A monitors and detects the bus signal over the $I^2C$ bus without affecting the voltages at the serial data line (SDL) and serial clock line (SCL). The data acquisition unit 31 receives a detected analog bus signal Si from the $I^2C$ bus and then generates an encoded data stream d1. The parser 32 decodes the encoded data stream d1 into a decoded command string c1. The command filtering unit 33 sequentially compares each command in the decoded command string c1 with a plurality of predetermined SAF-TE commands on a command-by-command basis. If any command in the decoded command string c1 matches with one of the predetermined SAF-TE commands, the command filtering unit 33 selects the matched command f1 from the decoded command string c1 for output. According to the operation code of the matched SAF-TE command f1, the look up table 35 generates a corresponding bit combination BC1. Next, the comparing unit 34 compares an associated field of the matched SAF-TE command f1 with the bit combination BC1. When the associated field of the matched SAF-TE command f1 is equal to the bit combination BC1, it indicates there is a drive failure event and the comparing unit 34 immediately sends a warning signal containing a drive failure flag to the BMC 20. Based on the content of the warning signal, the BMC 20 takes necessary steps, such as logging the drive failure event or informing the system administrator through the network. In a case that the number of the predetermined SAF-TE commands is equal to one, the look up table 35 can be eliminated and thus represented in dotted lines.

Figure 3B:
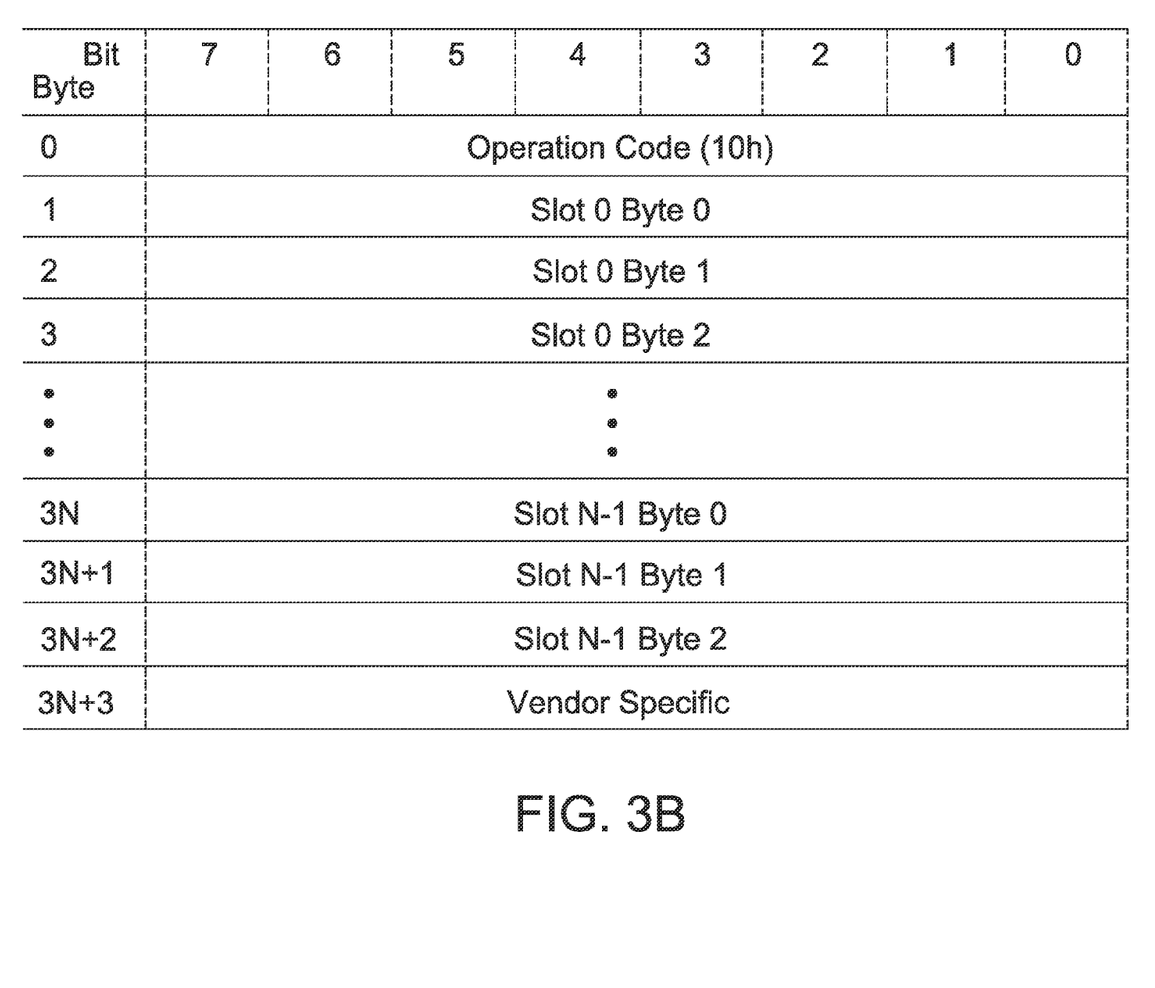
FIG. 3B shows a command format for a Write Device Slot Status command according to the SAF-TE interface specification.

The above predetermined SAF-TE commands includes, without limitation, READ_BUFFER commands and WRITE_BUFFER commands. Take a Write Device Slot Status command (one of the WRITE_BUFFER commands) for example. FIG. 3B shows a command format for a Write Device Slot Status command according to the SAF-TE interface specification. Referring to FIG. 3B, three bytes for each drive/slot (e.g., Slot 0 Byte 0~Slot 0 Byte 2 are for SATA/SAS drive 141) is a set of bit flags, which are used to drive the corresponding indicators 152 (e.g. LEDs, LCDs, audible alarms, etc.) to some meaningful states, depending on the vendor's implementation. A following example describes how the snoop device 21A detects a drive failure event from a Write Device Slot Status command sent from the HBA 26 to the SEP 15.

After collecting all the state information reported by all the SATA/SAS drives 141~14N, the HBA 26 may issue the Write Device Slot Status command to the SEP 15, convert it into a bus signal in the $I^2C$ bus format and send the bus signal through the $I^2C$ bus for informing the SEP 15 of each drive state. The data acquisition unit 31 receives a detected analog signal Si from the $I^2C$ bus and then generates an encoded data stream d1. The parser 32 decodes the encoded data stream d1 into a decoded command string c1. Since the decoded command string c1 and the predetermined SAF-TE commands contains the Write Device Slot Status command, the command filtering unit 33 selects the Write Device Slot Status command from the decoded command string c1 as the matched SAF-TE command f1 for output after making comparisons between the decoded command string c1 with the predetermined SAF-TE commands on a command-by-command basis. According to the operation code (10h) of the Write Device Slot Status command, the look up table 35 generates a corresponding bit combination BC1, such as 02h. Please note the BC1 value is adjustable depending on vendor's implementation. Then, the comparing unit 34 compares an associated field (e.g., Slot 0 Byte 0, Slot 1 Byte 0 ..., Slot N−1 Byte 0) of each slot with the bit combination BC1 (02h). If Slot 0 Byte 0 is equal to the bit combination BC1 (02h), it represents that a drive failure event occurs in the SATA/SAS drive 141 and the comparing unit 34 instantly sends a warning signal containing a drive failure flag to the BMC 20. Based on the warning signal containing a drive failure flag, the BMC 20 takes necessary steps, such as logging the drive failure event or informing the system administrator through the network.

Although the above embodiment is described herein in terms of SAF-TE commands in cooperation with $I^2C$ bus, it should be understood that the embodiments of the invention are not so limited, but are generally applicable to SES/SATA II/yet-to-be developed command protocols in cooperation with $I^2C$ bus.

Figure 4A:
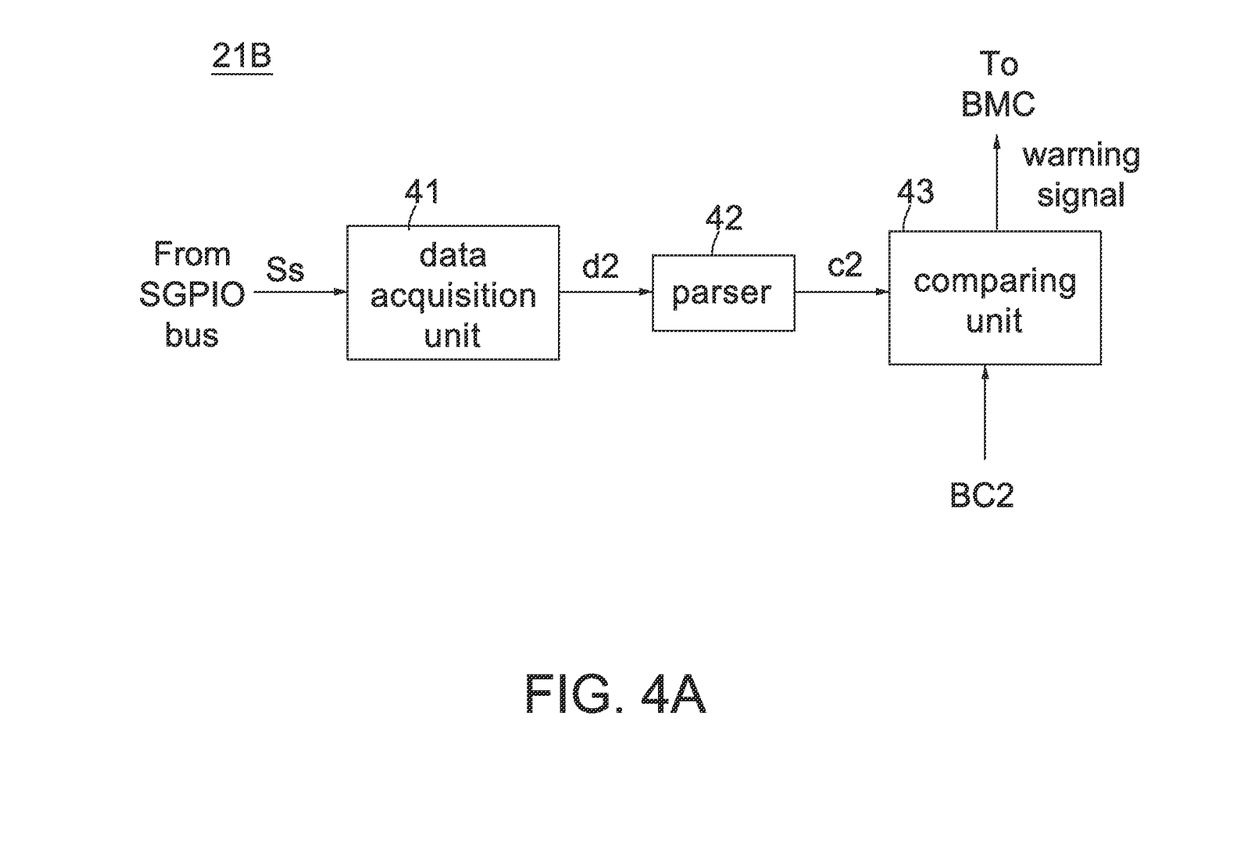
FIG. 4A is a block diagram of a snoop device according to another embodiment of the invention.
Figure 4B:
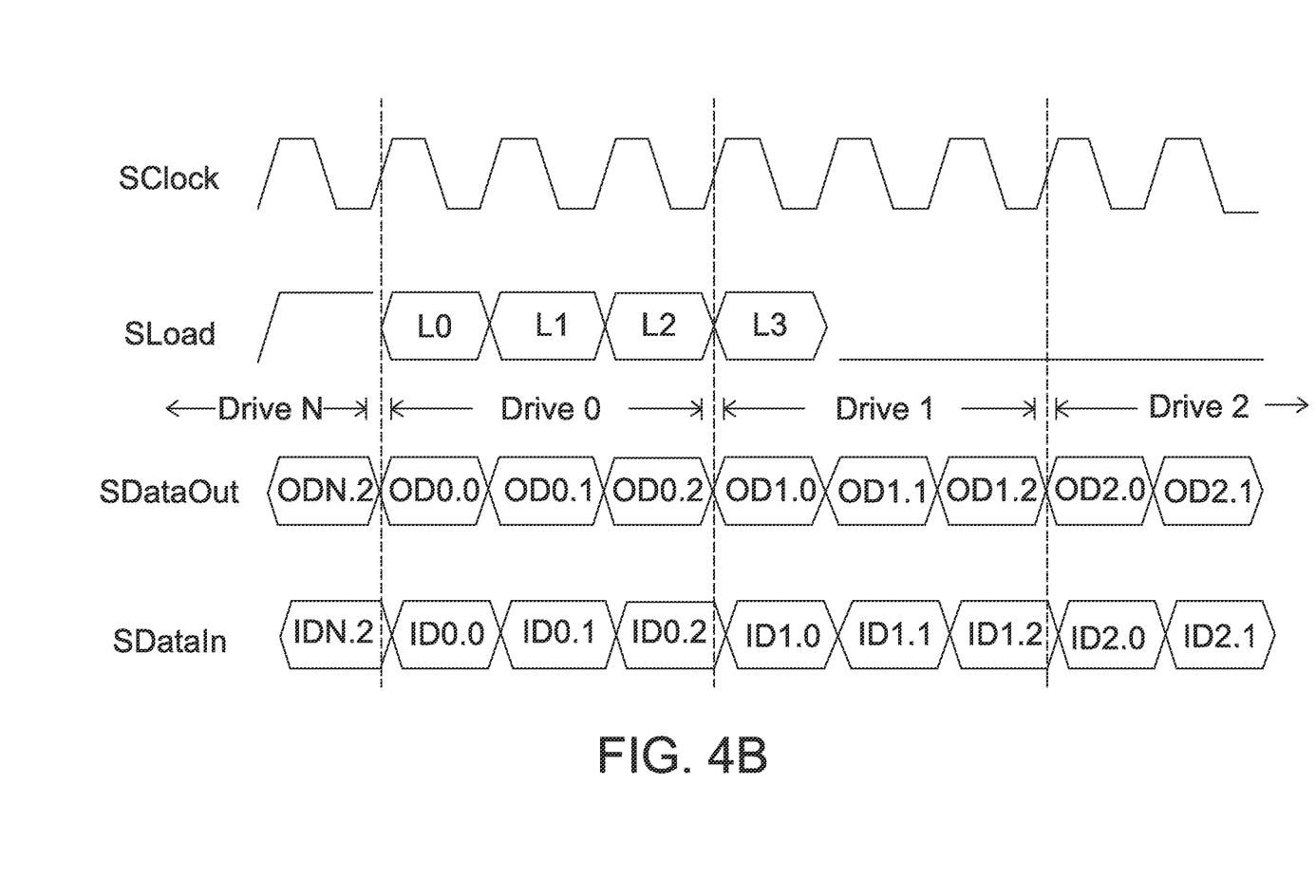
FIG. 4B shows the signal relationships between SClock, SLoad, SDataOut and SDataIn according to SFF-8485 specification.

FIG. 4A is a block diagram of a snoop device according to another embodiment of the invention. In the embodiment of FIG. 4A, assuming the serial bus 1c is SGPIO bus and the HBA 26 and is able to issue a bus signal in a SGPIO bus format (as shown in FIG. 4B below). Referring to FIG. 4A, the snoop device 21B includes a data acquisition unit 41, a parser 42 and a comparing unit 43. The SGPIO bus consists of four electrical signals: SClock, SLoad, SDataOut and SDataIn.

Please be noted that the snoop device 21B monitors and detects the bus signal over the SGPIO bus without affecting the voltages at four signals lines SClock, SLoad, SDataOut and SDataIn. The data acquisition unit 41 receives a detected analog bus signal Ss from the SGPIO bus and then generates an encoded bit stream d2. The parser 42 decodes the encoded bit stream d2 into a decoded bit stream c2. The comparing unit 43 compares the decoded bit stream c2 with a bit combination BC2. When the content of the decoded bit stream c2 is equal to the bit combination BC2, it indicates there is a drive failure event and the comparing unit 43 immediately sends a warning signal containing a drive failure flag to the BMC 20. Based on the content of the warning signal, the BMC 20 takes necessary steps, such as logging the drive failure event or informing the system administrator through the network.

FIG. 4B shows the signal relationships between SClock, SLoad, SDataOut and SDataIn according to SFF-8485 specification. Referring to FIG. 4B, following the start of a new SGPIO frame, three bits per drive are driven from the HBA 26 to the SDataOut line and it shows SGPIO for N drives. According to IBPI (international blinking pattern interpretation) specification, the three bits per drive are interpreted as follows. The first bit (ODN.0) is exclusively used to represent Activity. The second and third bits: Locate (ODN.1) and Fail (ODN.2) are directly used to represent a locate state and a fail state of the SATA/SAS drive 14N. In a following example, how the snoop device 21B detects a drive failure event from a SGPIO bus is described and it is assumed that the bit combination BC2 (inputted to the comparing unit 43) is set to 100 b.

After collecting all the state information reported by all the SATA/SAS drives 141~14N, the HBA 26 may issue a bus signal in the SGPIO bus format and send the bus signal through the SGPIO bus for informing the SEP 15 of each drive state. The data acquisition unit 41 receives a detected analog signal Ss from the SGPIO bus and then generates an encoded bit stream d2. The parser 42 decodes the encoded bit stream d2 into a decoded bit stream c2. Then, the comparing unit 43 compares the Activity, Locate and Fail bits (ODN.0~ODN.2) for each drive with the bit combination BC2, such as 100 b. Please note the BC2 value is adjustable depending on vendor's implementation. If the Activity, Locate and Fail bits of the drive N are equal to the bit combination BC2 (100 b), it indicates that a drive failure event occurs in the SATA/SAS drive 14N and the comparing unit 43 instantly sends a warning signal containing a drive failure flag to the BMC 20. Based on the warning signal containing a drive failure flag, the BMC 20 takes necessary steps, such as logging the drive failure event or informing the system administrator through the network.

According to the invention, any HD failure event can be detected and dealt with in real time by monitoring the serial bus 1c between the HBA 12 and the SEP 15, without the need of additionally installing S.M.A.R.T. software on the host system 11 and providing a PCIe/$I^2C$ bus between the HBA 12 and the BMC 20. Thus, the invention avoids any data leakage risk and saves hardware cost.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A server system, comprising:
    a host system;
    at least one hard disk (HD) drive, each providing its own drive state;
    a host bus adapter (HBA) coupled to the host system and the at least one HD drive for issuing a bus signal in a format suitable for transmission over a serial bus according to a received drive state from the at least HD drive and sending the bus signal over the serial bus;
    at least one indicator;
    a storage enclosure processor (SEP) for receiving the bus signal over the serial bus and driving the at least one indicator to corresponding states;
    a baseboard management controller (BMC) coupled to a network; and
    a snoop device for detecting the bus signal over the serial bus between the HBA and the SEP, and actively sending a warning signal to the BMC in real time when a drive failure event is detected, wherein the BMC is passively informed by the snoop device.

2. The server system according to claim 1, wherein the snoop device is embedded inside the BMC.

3. The server system according to claim 1, wherein the snoop device is separated from the BMC.

4. The server system according to claim 1, wherein the serial bus is one of inter-integrated circuit ($I^2C$) bus and serial general purpose input/output (SGPIO) bus.

5. The server system according to claim 4, wherein when the serial bus is $I^2C$ bus, the HBA issues a command according to the received drive state from the at least HD drive, converts the command into the bus signal in a $I^2C$ bus format and sending the bus signal over the $I^2C$ bus.

6. The server system according to claim 5, wherein the command is compliant with one of SCSI Enclosure Services (SES), SCSI Accessed Fault-Tolerant Enclosure (SAF-TE), and serial advanced technology attachment (SATA) II command protocols.

7. The server system according to claim 1, wherein the snoop device comprises:
    a data acquisition unit for detecting the bus signal over the serial bus and generating a first encoded data stream;
    a parser for decoding the first encoded data stream into a decoded command string;
    a command filtering unit for sequentially comparing each command in the decoded command string with at least one predetermined command to select a matched command from the decoded command string for output; and
    a comparing unit for comparing an associated field of the matched command with a first bit combination to determine whether to send the warning signal to the BMC.

8. The server system according to claim 7, wherein the snoop device further comprises:
    a look-up table for outputting the first bit combination according to an operation code of the matched command.

9. The server system according to claim 1, wherein the snoop device comprises:

a data acquisition unit for detecting the bus signal from the serial bus and generating a second encoded data stream;

a parser for decoding the second encoded data stream into a decoded bit stream; and a comparing unit for comparing the decoded bit stream with a second bit combination to determine whether to send the warning signal to the BMC.

10. The server system according to claim 1, wherein when receiving the warning signal, the BMC informs the system administrator through the network.

* * * * *